US012762853B2

(12) United States Patent
Kim et al.

(10) Patent No.: US 12,762,853 B2
(45) Date of Patent: Oct. 13, 2026

(54) APPARATUS AND METHOD FOR INTEGRATED ANOMALY DETECTION

(71) Applicant: ELECTRONICS AND TELECOMMUNICATIONS RESEARCH INSTITUTE, Daejeon (KR)

(72) Inventors: Do-Hyung Kim, Daejeon (KR); Ho-Beom Jeon, Daejeon (KR); Hyung-Min Kim, Seongnam-si (KR); Jae-Hong Kim, Daejeon (KR); Jeong-Dan Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 332 days.

(21) Appl. No.: 18/479,499

(22) Filed: Oct. 2, 2023

(65) Prior Publication Data

US 2024/0127587 A1 Apr. 18, 2024

(30) Foreign Application Priority Data

Oct. 6, 2022 (KR) ........................ 10-2022-0128070
May 17, 2023 (KR) ........................ 10-2023-0063771

(51) Int. Cl.
*G06V 10/82* (2022.01)
*G06V 40/20* (2022.01)

(52) U.S. Cl.
CPC .............. *G06V 10/82* (2022.01); *G06V 40/23* (2022.01)

(58) Field of Classification Search
CPC ...... G06V 10/82; G06V 40/23; G06V 10/454; G06V 20/52; G06V 10/761; G06V 40/20
See application file for complete search history.

(56) References Cited

U.S. PATENT DOCUMENTS

2015/0029308 A1 1/2015 Han et al.
2018/0107881 A1* 4/2018 Datta ...................... G06T 7/251
2019/0180090 A1* 6/2019 Jiang .................... G06V 10/454
2021/0152583 A1* 5/2021 Adeli ...................... G06N 3/006
2022/0141328 A1 5/2022 Baek et al.
2023/0051232 A1* 2/2023 Zhou ...................... G06V 40/20
2023/0306489 A1* 9/2023 Kong ....................... G06N 5/04
2023/0326195 A1* 10/2023 Venkataramanan ... G06N 3/084 382/157

FOREIGN PATENT DOCUMENTS

KR 10-2319083 B1 11/2021
KR 10-2344606 B1 12/2021

OTHER PUBLICATIONS

Hyungmin Kim et al., "Lightweight framework for the violence and falling-down event occurrence detection for surveillance videos", 2022 13th International Conference on Information and Communication Technology Convergence (ICTC), Oct. 19, 2022.
Ho Beom Jeon, "Anomaly Detection Framework for Intelligent Video Surveillance", dCollection, Artificial Intelligence, University of Science and Technology, Aug. 2022.

* cited by examiner

*Primary Examiner* — Syed Haider
(74) *Attorney, Agent, or Firm* — Rabin & Berdo, P.C.

(57) ABSTRACT

Disclosed herein is a method for integrated anomaly detection. The method includes detecting a thing object and a human object in input video using a first neural network, and tracking the human object, and detecting an anomalous situation based on an object detection result and a human object tracking result.

16 Claims, 6 Drawing Sheets

APPARATUS AND METHOD FOR INTEGRATED ANOMALY DETECTION

CROSS REFERENCE TO RELATED APPLICATIONS

This application claims the benefit of Korean Patent Applications No. 10-2022-0128070, filed Oct. 6, 2022, and No. 10-2023-0063771, filed May 17, 2023, which are hereby incorporated by reference in their entireties into this application.

BACKGROUND OF THE INVENTION

1. Technical Field

The present disclosure relates to unified anomaly detection technology capable of detecting multiple anomalous situations in an integrated manner.

More particularly, the present disclosure relates to object detection and tracking technology for detecting multiple anomalous situations in an integrated manner.

2. Description of the Related Art

Recently, Closed-Circuit Televisions (CCTVs) have been installed all over a city as well as in security facilities in order to reduce loss of life and property damage caused by crime and accidents. However, because rapidly increasing CCTVs are monitored by a small number of controllers, a monitoring efficiency issue was raised, and the needs for securing more controllers and an anomaly detection system for automated intelligent video surveillance are increasing. The anomaly detection system is able to trigger an alarm event by detecting an incident or an accident in advance and to quickly search for the occurrence of an incident even after the occurrence of the incident, thereby significantly improving monitoring efficiency.

Therefore, most control centers attempt to adopt anomaly detection systems based on artificial intelligence (AI) technology in order to ensure smooth crisis response capabilities and secure the golden hour of an accident. However, the current systems are very limitedly used in practical environments due to various problems. In order to construct and secure advanced anomaly detection systems that are applicable in the fields, it is essential to solve the following problems.

First, a unified integrated framework capable of comprehensively detecting multiple anomalous situations is required. CCTV-based intelligent anomaly detection technologies for establishing social safety networks are being used in order to detect various situations such as intrusion, loitering, abandonment, arson, falling down, and fighting that can occur in real-world situations. However, most conventional technologies merely propose a detection method optimized for only a single anomalous situation and fail to present an integrated framework capable of comprehensively detecting and handling multiple different anomalous situations. In order to simultaneously respond to the occurrence of multiple anomalous situations, a unified integrated framework capable of ensuring real-time responsiveness and reliability of the system by organically combining detection modules having different characteristics is required.

Also, it is necessary to secure stable human detection and tracking technologies first. In order to detect anomalous situations related to individuals appearing in video, human detection and tracking technologies are required. The performance of technologies for detecting and tracking multiple objects in a video environment has rapidly improved through open competitive challenges. However, it is not easy to ensure the stability of human detection in CCTV environments due to frequent changes in lighting, weather, and environments and different distances and angles between cameras and humans. When human detection and tracking technology fails to correctly detect humans or falsely detects an object as a human, the performance of the entire surveillance system may significantly decrease. Accordingly, technology for correctly detecting and tracking humans in various indoor and outdoor CCTV environments is required in order to ensure the reliability of the surveillance system.

Also, versatility enabling detection of anomalous situations even in unlearned, new CCTV environments is required. Most existing studies on anomaly detection deal with training and evaluation using previously collected data. However, it is highly unlikely that there is a large amount of training data collected from a target domain in advance in which the system is to be installed, and it is very difficult to collect such data. Accordingly, what is required is anomaly detection technology capable of operating robustly in response to various changes in CCTV environments without collecting additional data.

Documents of Related Art (Patent Document 1) Korean Patent No. 2344606 titled "CCTV system for tracking and monitoring object and tracking and monitoring method therefor".

SUMMARY OF THE INVENTION

An object of the present disclosure is to provide an integrated anomaly detection structure capable of simultaneously responding to the occurrence of multiple anomalous situations.

Another object of the present disclosure is to provide a filtering technique capable of reducing false detection as a human object and tracking failure.

A further object of the present disclosure is to provide an anomaly detection method that robustly operates in various environments without collecting additional data.

In order to accomplish the above objects, a method for integrated anomaly detection according to an embodiment of the present disclosure includes detecting a thing object and a human object in input video using a first neural network, tracking the human object, and detecting an anomalous situation based on an object detection result and a human object tracking result.

Here, tracking the human object may be performed using first feature information generated based on the intermediate operation result of the first neural network and second feature information extracted using a second neural network, to which a human object region corresponding to the final operation result of the first neural network is input.

Here, the intermediate operation result may include spatial information and texture information pertaining to the input video, and the first feature information may be extracted by masking a region of the detected human object for the intermediate operation result.

Here, tracking the human object may comprise matching identical human objects in frames using the first feature information and the second feature information.

Here, the first feature information may correspond to an M-dimensional feature vector, and the second feature information may correspond to an N-dimensional feature vector.

Here, tracking the human object may comprise tracking the human object using an (M+N)-dimensional feature vector generated based on the first feature information and the second feature information.

Here, the human object tracking result may include a region occupied by the human object and moving trajectory information of the human object.

Here, tracking the human object may comprise identifying a thing object erroneously detected as a human object based on the moving trajectory information of the human object.

Here, tracking the human object may comprise calculating a motion vector corresponding to a moving trajectory of the human object and identifying the thing object erroneously detected as a human object using a result of an outer product operation on motion vectors for respective sections.

Here, detecting the anomalous situation may comprise detecting an arson situation using visual feature information corresponding to the input video and linguistic feature information corresponding to text describing an arson situation.

Here, detecting the anomalous situation may comprise mapping the visual feature information and the linguistic feature information to an identical comparison space and calculating the similarity between the visual feature information and the linguistic feature information, thereby detecting the arson situation.

Here, the visual feature information may be generated based on the input video, an image of a region of the human object, and an image of a region in which the human object is determined to stay longer than a preset time.

Here, detecting the anomalous situation may comprise detecting human object behavior, setting main behavior of each section based on the frequency of the human object behavior, and calculating a section in which an anomalous situation occurs using information about the main behavior of each section.

Here, the anomalous situation may include intrusion, loitering, arson, abandonment, fighting, and falling down.

Also, in order to accomplish the above objects, an apparatus for integrated anomaly detection according to an embodiment of the present disclosure includes an object detection unit for detecting a thing object and a human object in input video using a first neural network, a human object tracking unit for tracking the human object, and an anomaly detection unit for detecting an anomalous situation based on an object detection result and a human object tracking result.

Here, the human object tracking unit may track the human object using first feature information generated based on the intermediate operation result of the first neural network and second feature information extracted using a second neural network to which a human object region corresponding to the final operation result of the first neural network is input.

Here, the intermediate operation result may include spatial information and texture information pertaining to the input video, and the first feature information may be extracted by masking a region of the detected human object for the intermediate operation result.

Here, the human object tracking unit may match identical human objects in frames using the first feature information and the second feature information.

Here, the first feature information may correspond to an M-dimensional feature vector, and the second feature information may correspond to an N-dimensional feature vector.

Here, the human object tracking unit may track the human object using an (M+N)-dimensional feature vector generated based on the first feature information and the second feature information.

Here, the human object tracking result may include a region occupied by the human object and moving trajectory information of the human object.

Here, the human object tracking unit may identify a thing object erroneously detected as a human object based on the moving trajectory information of the human object.

Here, the human object tracking unit may calculate a motion vector corresponding to a moving trajectory of the human object and identify the thing object erroneously detected as a human object using a result of an outer product operation on motion vectors for respective sections.

Here, the anomaly detection unit may detect an arson situation using visual feature information corresponding to the input video and linguistic feature information corresponding to text describing an arson situation.

BRIEF DESCRIPTION OF THE DRAWINGS

The above and other objects, features, and advantages of the present disclosure will be more clearly understood from the following detailed description taken in conjunction with the accompanying drawings, in which.

DESCRIPTION OF THE PREFERRED EMBODIMENTS

Figure 1:
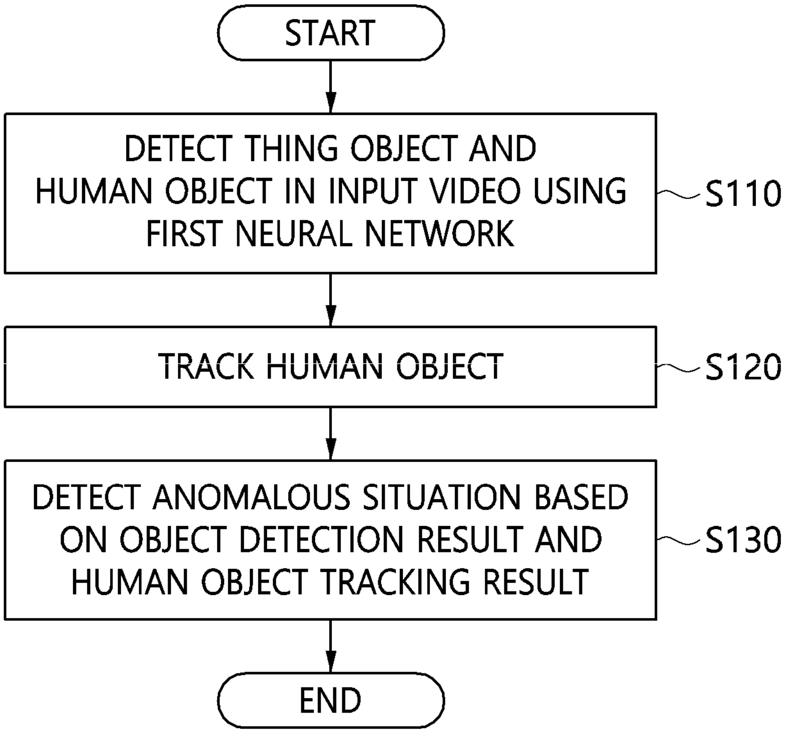
FIG. 1 is a flowchart illustrating a method for integrated anomaly detection according to an embodiment of the present disclosure.

The advantages and features of the present disclosure and methods of achieving them will be apparent from the following exemplary embodiments to be described in more detail with reference to the accompanying drawings. However, it should be noted that the present disclosure is not limited to the following exemplary embodiments, and may be implemented in various forms. Accordingly, the exemplary embodiments are provided only to disclose the present disclosure and to let those skilled in the art know the category of the present disclosure, and the present disclosure is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present disclosure.

The terms used herein are for the purpose of describing particular embodiments only and are not intended to limit the present disclosure. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

In the present specification, each of expressions such as "A or B", "at least one of A and B", "at least one of A or B", "A, B, or C", "at least one of A, B, and C", and "at least one of A, B, or C" may include any one of the items listed in the expression or all possible combinations thereof.

Unless differently defined, all terms used herein, including technical or scientific terms, have the same meanings as terms generally understood by those skilled in the art to which the present disclosure pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, embodiments of the present disclosure will be described in detail with reference to the accompanying drawings. In the following description of the present disclosure, the same reference numerals are used to designate the same or similar elements throughout the drawings, and repeated descriptions of the same components will be omitted.

FIG. 1 is a flowchart illustrating a method for integrated anomaly detection according to an embodiment of the present disclosure.

The method for integrated anomaly detection according to an embodiment of the present disclosure may be performed by an anomaly detection apparatus such as a computing device.

Referring to FIG. 1, the method for integrated anomaly detection according to an embodiment of the present disclosure includes detecting a thing object and a human object in input video using a first neural network at step S110, tracking the human object at step S120, and detecting an anomalous situation based on an object detection result and a human object tracking result at step S130.

Here, tracking the human object at step S120 may be performed using first feature information, corresponding to the intermediate operation result of the first neural network, and second feature information extracted using a second neural network to which a human object region corresponding to the final operation result of the first neural network is input.

Here, the first feature information may indicate spatial information and texture information pertaining to the input video, and the second feature information may indicate the appearance information of the human object.

Here, tracking the human object at step S120 may comprise matching the same human objects in frames using the first feature information and the second feature information.

Here, the first feature information may correspond to an M-dimensional feature vector, and the second feature information may correspond to an N-dimensional feature vector. Here, each of M and N may be an arbitrary natural number.

Here, tracking the human object may comprise tracking the human object using an (M+N)-dimensional feature vector generated based on the first feature information and the second feature information.

Here, the human object tracking result may include a region occupied by the human object and moving trajectory information of the human object.

Here, tracking the human object at step S120 may comprise identifying a thing object erroneously detected as a human object based on the moving trajectory information of the human object.

Here, tracking the human object at step S120 may comprise calculating a motion vector corresponding to the moving trajectory of the human object and identifying a thing object erroneously detected as a human object using a result of an outer product operation on motion vectors of respective sections.

Here, detecting an anomalous situation at step S130 may comprise detecting an arson situation using visual feature information corresponding to the input video and linguistic feature information corresponding to text generated based on the input video.

Here, detecting an anomalous situation at step S130 may comprise mapping the visual feature information and the linguistic feature information to the same comparison space and calculating the similarity between the visual feature information and the linguistic feature information, thereby detecting an arson situation.

Here, the visual feature information may be generated based on the input video, an image of the human object region, and an image of a region in which the human object is determined to stay longer than a preset time.

Here, detecting an anomalous situation at step S130 may comprise detecting human object behavior, setting main behavior in each section based on the frequency of the human object behavior, and calculating a section in which an anomalous situation occurs using the main behavior information in each section.

Here, the anomalous situation may include intrusion, loitering, arson, abandonment, fighting, and falling down.

Figure 2:
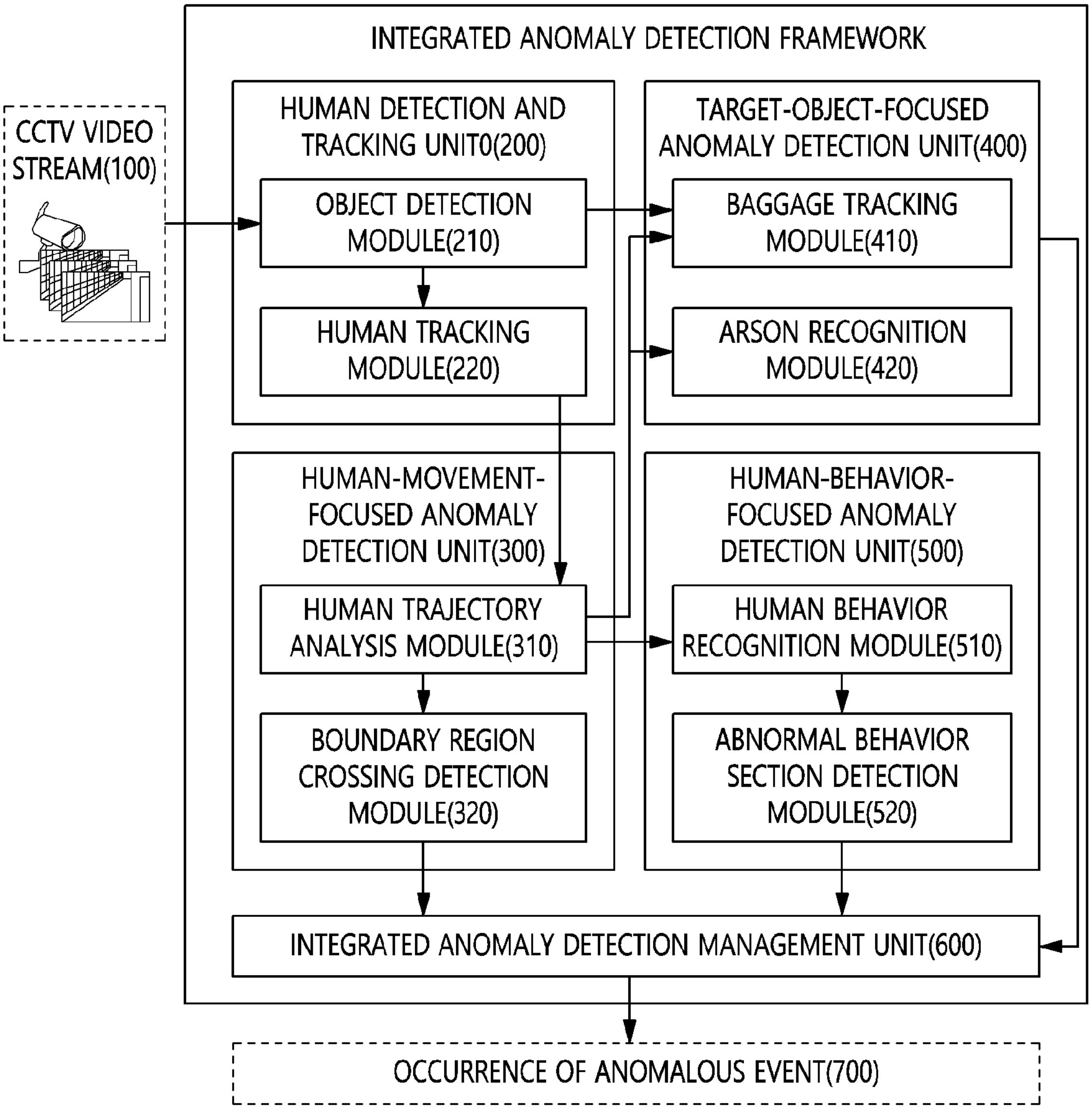
FIG. 2 is a block diagram illustrating an anomaly detection framework according to an embodiment of the present disclosure.

FIG. 2 is a block diagram illustrating an anomaly detection framework according to an embodiment of the present disclosure.

Referring to FIG. 2, an integrated anomaly detection framework according to an embodiment of the present disclosure may include a human detection and tracking unit 200, a human-movement-focused anomaly detection unit 300, a target-object-focused anomaly detection unit 400, a human-behavior-focused anomaly detection unit 500, and an integrated anomaly detection management unit 600.

Here, the human detection and tracking unit 200 may receive a video stream 100 acquired by a CCTV, track a human, and generate a region and a trajectory of the human in the video.

The human-movement-focused anomaly detection unit 300 analyzes a trajectory by receiving the region and trajectory of a human and detects how long the human stays at a boundary region, thereby detecting intrusion and loitering, which are anomalous situations related to the movement of a human.

The target-object-focused anomaly detection unit 400 tracks baggage by receiving human detection information, human trajectory information, and object detection information and recognize an arson scene, thereby detecting abandonment and arson, which are anomalous situations related to objects.

The human-behavior-focused anomaly detection unit 500 recognizes behavior of a human by receiving human detection information and human trajectory information and detects a section in which the behavior occurs, thereby detecting fighting and falling down, which are anomalous situations related to human behavior.

The integrated anomaly detection management unit 600 may manage various kinds of anomalous situations having different characteristics, which are detected by the respective anomaly detection units 300, 400, and 500, in an integrated manner and finally trigger an event 700 corresponding to each of the anomalous situations.

Hereinafter, the respective modules forming the anomaly detection framework will be described in detail.

The human detection and tracking unit 200 may detect objects including humans and track humans in order to collect the location information of humans appearing in the video. The human detection and tracking unit 200 may include an object detection module 210 and a human tracking module 220.

The object detection module 210 may estimate a classification label of an object in the video, location information thereof, and the probability of the existence of the object. In an embodiment of the present disclosure, known models such as a Region-based Convolutional Neural Network (R-CNN), You Only Look Once (YOLO), and the like may be used as an object detection model, but the scope of the present disclosure is not limited thereto. The object detection module 210 may acquire location information pertaining to only an object classified as a human and transfer the same to the human tracking module 220.

The human tracking module 220 may determine whether humans appearing in respective frames are the same person, assign the same tracking ID for the same person, and generate a trajectory based on human locations. In an embodiment of the present disclosure, known models such as Deep SORT, Omni-Scale Network (OSNet), and the like may be used as a human tracking model, but the scope of the present disclosure is not limited thereto. The human tracking module 220 may transfer the generated human trajectory information to a human trajectory analysis module 310.

A large number of large-scale image datasets for object detection is open to the public. The large-scale datasets include object images to which various environmental conditions, such as lighting, the sizes of objects, camera angles, changes in backgrounds, and the like, are reflected. Accordingly, object detection modules trained with such large-scale datasets may operate stably in spite of various changes in an environment.

However, the number of datasets for object tracking, which have to be formed of a series of image streams (video), is very small, compared to the number of datasets for object detection, and most datasets for object tracking are acquired by capturing images of the whole body of a human using CCTVs.

Accordingly, the conventional human tracking modules have a disadvantage that they are very vulnerable to environments that are not learned thereby, and this may directly affect a decrease in the reliability of the entire integrated anomaly detection framework.

Specifically, a human tracking module configured to assign an identity using similarity performs tracking using a feature extractor that represents features, such as the shapes or colors of clothes and bags worn by people in the video, as identity vectors. Appearance information included in the data distribution with which the feature extractor is trained may be useful to track the same person, because features are compared using identity vectors in a high-dimensional space. However, in an unlearned data distribution environment in which appearance information that is not included in the learned dataset is extracted as identity vectors, it may be difficult to stably map the identity vectors.

For example, when the feature extractor is not sufficiently trained with appearance information of people in rainy days, the same person may be recognized as different people for the respective cases in which the person is holding up an umbrella and in which the person is carrying the umbrella. That is, because human images sampled from a training dataset for human tracking are collected in a limited environment, various types of appearance information suitable for the service environment cannot be provided, and it is difficult for the feature extractor to stably perform identity vector mapping in various CCTV operating conditions.

The anomaly detection system for intelligent video surveillance is of growing importance at night and in bad weather conditions under which it is difficult to perform surveillance. Accordingly, it is essential for the anomaly detection system to secure stable human-tracking performance.

An anomaly detection method according to an embodiment of the present disclosure provides a method capable of improving human tracking performance using feature information extracted by an object detection module in order to enable human tracking robust to various environmental conditions and bad weather conditions.

Figure 3:
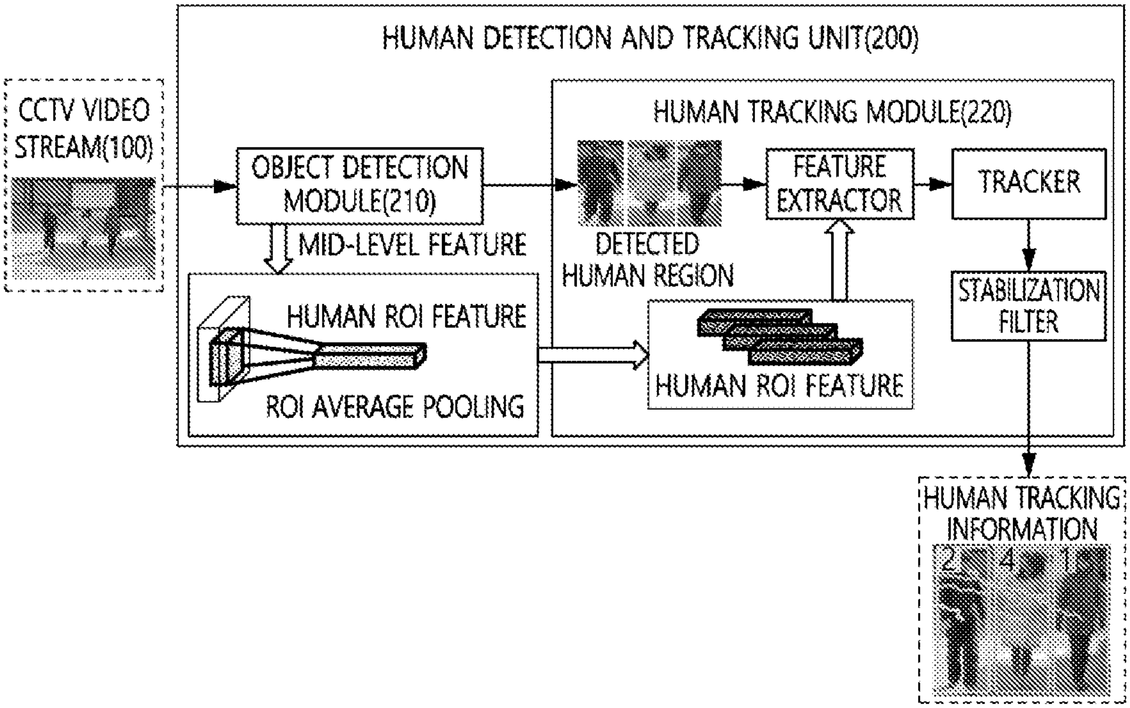
FIG. 3 is a block diagram illustrating a human tracking module according to an embodiment of the present disclosure.

FIG. 3 is a block diagram illustrating a human tracking module according to an embodiment of the present disclosure.

Referring to FIG. 3, the human detection and tracking unit 200 may include an object detection module 210 and a human tracking module 220.

The human detection and tracking unit 200 first detects the location of a human in the received video stream 100 using the object detection module 210 and tracks the human through a process of matching the human to a previously appearing human through a comparison therewith. The identification procedure of the human tracking module 220 may include a human feature extraction process, a human tracking process, and a trajectory stabilization process. In order to identify individual humans, a feature extractor may extract an N-dimensional identity vector by receiving a human region detected in the current frame.

A tracker calculates the similarities between the identity vectors stored in the human information that is being tracked and the identity vectors extracted from the current frame, whereby the tracking ID corresponding to the highest similarity may be assigned. After that, trajectory information about the movement of the tracked human may be predicted and corrected through a stabilization filter.

The human tracking method according to an embodiment of the present disclosure is a dimension expansion method for stably acquiring identity vectors, which are highly dependent on environments, in any of various environments.

A deep-learning-based object detection module may estimate the type of an object in an image, the location information thereof, and the probability of the existence of the object. As described above, the object detection module may extract edge shapes and internal texture information of various objects using massive datasets, and may learn a spatial relationship and information about the correlation between objects in order to accurately infer location information.

Mid-level features acquired in the intermediate operation process of the object detection module may include spatial information and texture information extracted from the entire image in order to classify objects and identify locations.

In the tracking process performed after the locations of humans are identified, not information extracted from the entire image but information about individual humans has to be selected. The location information is preserved in order to detect the locations of the humans, and information about the individual humans is acquired by setting the respective human regions as Regions of Interest (ROI) and masking the object-detection-related feature information acquired in the image. The information masked as the regions of the individual humans are transformed into M-dimensional object feature vectors through an average pooling process. Using the object feature vector extracted by the object detection module, the N-dimensional identity vector represented by the feature extractor of the human tracking module is expanded, whereby an (M+N)-dimensional vector may be formed and used for human tracking.

The method of expanding the dimensions of an identity vector according to an embodiment of the present disclosure is a method of using feature information of human appearance that is learned by alternating between the information representation space of the object detection module and the representation space of the feature extractor in order to perform tracking. By expanding dimensions, pieces of appearance information extracted from different modules may be simultaneously retrieved, and different humans, which used to be unidentifiable due to a limitation in representable dimensions, may be distinguished and identified.

Also, because the information acquired by the object detection module is reused, the performance of human tracking may be efficiently improved at low cost.

Also, because the amount and the learning modality of a dataset used by the object detection module differ from those of a dataset used by the human tracking module, appearance features may be complementarily extracted, and this method may be applied to various human tracking methods.

The human-movement-focused anomaly detection unit 300 receives the region and trajectory of a human, which are output from the human detection and tracking unit 200, thereby analyzing the trajectory. Also, it detects how long the human stays in the edge region, thereby detecting intrusion and loitering, which are anomalous situations related to the movement of the human.

The human trajectory analysis module 310 analyzes trajectory information, which is continuous location information of the human that is being tracked, thereby verifying whether the object tracked as a human is a real human or an object falsely detected as a human.

Multiple object detection datasets used for training of the object detection module 210 widely use mean Average Precision (mAP) as a performance evaluation standard. The mAP evaluation method, which is configured to calculate average precision (AP) for an individual object to be detected and to again average the results of average precision in order to evaluate performance for multiple objects, has a problem that it is focused on the performance of accurate detection of the locations of objects, rather than the performance of correct recognition and classification of objects.

More specifically, the mAP method performs evaluation by extracting only probabilities corresponding to the target objects to be evaluated, calculating the degrees of accuracy of the probabilities, and averaging the respective degrees of accuracy. For example, even if the object detection module erroneously predicts that the probability that another object is placed at the location of a chair is higher than the probability that the chair is placed at the corresponding location, chair detection performance is not affected. Even if the probability that a dog is present in the human region of an image is determined to be higher than the probability that a person is present therein, the object classification performance for identifying a human is not decreased. That is, the conventional high-performance object detection module is designed by focusing on precisely estimating a location, rather than correctly classifying objects.

The object detection module, the classification performance of which is verified insufficiently as described above, has a problem that an error in which an object that is not a human is classified as a human frequently occurs. Because humans and objects are not distinguished in the human tracking process performed after object detection, an object that is erroneously tracked as a human may continuously cause unnecessary anomaly detection operations. Accordingly, excluding erroneously detected objects from the operation process of the anomaly detection unit is required along with speeding up the operation in order to accurately detect anomalous situations.

Because tracking is performed for each frame, a subtle change between images causes location noise in the object detection module, and the location noise is amplified in a prediction operation in the human tracking process, whereby the location information pertaining to a stationary object is randomly moved up, down, left, and right. As a result, the travel distance measured based on the trajectory of the falsely detected object staying at the same spot becomes similar to the travel distance of a human, and which makes identification difficult.

Also, in the case of displacement, which is a change between the location at which an object first appeared and the current location, it is difficult to provide a reliable human analysis result due to failure of ID assignment. In order to stably measure the movement of an object, a method of quantitively measuring the movement by eliminating noise from the trajectory of the tracked object is required.

The method of analyzing a human trajectory according to an embodiment of the present disclosure effectively eliminates noise from the moving trajectory information of an object detected in an image, thereby identifying an object erroneously detected as a human. An area calculation technique, which uses the directionality of a vector so as to eliminate location noise randomly moved up, down, left, and right and to accurately measure the degree of movement in an image, is used. Equations (1) and (2) below respectively represent a polygon area calculation method using changes in coordinates and a polygon area calculation method using a vector outer product operation.

$$\text{Area} = \frac{1}{2}\sum_{i=1}^{n} x_i(y_{i+1} - y_{i-1}) \tag{1}$$

-continued $$\text{Area} = \frac{1}{2} \cdot \left| \sum_{i=1}^{n} v_i \wedge v_{i+1} \right| \quad (2)$$

Equation (1) calculates an area by adding an area decreasing along a y-axis and an area increasing along the y-axis with opposite signs using the 2D vertices (x, y) of a polygon. Equation (2) is an equation that is acquired by changing Equation (1) so as to determine the sign of the area of a polygon depending on the correlation between vectors.

Equation (2) determines whether rotation is clockwise or counterclockwise through the outer product of two vectors and calculates an area by setting opposite signs for the respective cases. When the area of a polygon is calculated using Equation (2), the values of noise moved up, down, left, and right cancel out each other, rather than being added to normal area calculation corresponding to actual movement.

Figure 4:
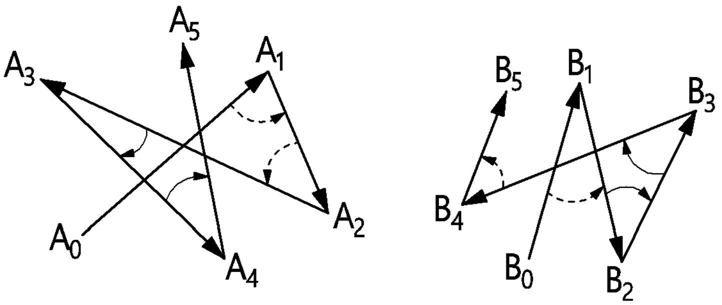
FIG. 4 is an example of a moving trajectory detected in a stationary object.

FIG. 4 is an example of a moving trajectory detected in a stationary object.

Referring to FIG. 4, the moving trajectory detected in a stationary object has a characteristic in which it randomly moves because noise is included therein. Because vectors $A_0A_1$ and $A_1A_2$ have a counterclockwise relationship, the area of triangle $A_0A_1A_2$ is calculated as a negative value. Conversely, vectors $A_2A_3$ and $A_3A_4$ have a clockwise relationship, the area of triangle $A_2A_3A_4$ is calculated as a positive value. As described above, the trajectory area from which noise is eliminated may be calculated in consideration of the directions of the vectors.

Also, the method of calculating the area of a moving trajectory according to an embodiment of the present disclosure enables a trajectory area to be calculated in consideration the direction even though large noise is made due to repetitive occurrence of ID switching, which is one example of human tracking failure. Also, because a vector operation is used, noise in movement in the 3D space as well as in the 2D space may be eliminated. If it is possible to quantitively measure movement of a human, an erroneously detected object may be identified using the degree of movement. Also, because the area is calculated by segmenting the moving trajectory into short sections, the state in which a human is stationary is detected, and dangerous factors and regions may be identified.

The human trajectory analysis module 310 filters out a result of erroneous detection made by the human detection and tracking unit, quantitively measures the movement of a human, and transfers the same to other anomaly detection units 400 and 500.

A boundary region crossing detection module 320 quickly and efficiently detects intrusion and loitering only using the location information of a human. The degree of overlap between a preset boundary region and the region corresponding to a human body in each CCTV screen is calculated, whereby whether the human enters the boundary region is determined. The time at which the human enters a region to which access is limited and the time at which the human leaves the region are transferred to the integrated anomaly detection management unit 600.

The target-object-focused anomaly detection unit 400 tracks baggage and recognizes an arson scene by receiving human detection information, human trajectory information, and object detection information, thereby detecting abandonment and arson, which are anomalous situations related to an object.

A baggage tracking module 410 is a module for tracking baggage, identifying the owner of the baggage, and detecting the behavior of abandoning the baggage. Using object detection information, a purse, a backpack, a suitcase, and the like corresponding to accessories of humans may be tracked. For the tracked object, the owner thereof is identified and assigned, and when a human carrying baggage abandons the baggage and leaves the place, the behavior is detected, and the result of detection is transferred to the integrated anomaly detection management unit 600.

Figure 5:
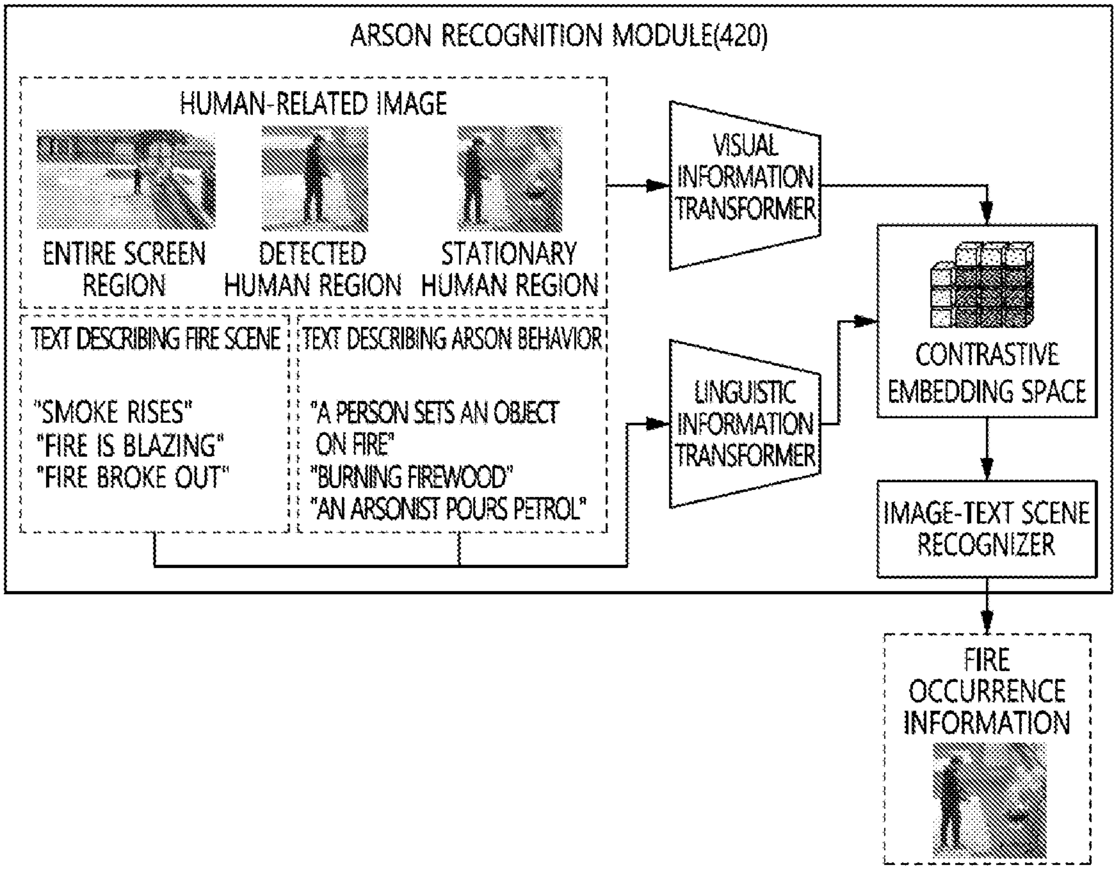
FIG. 5 is a block diagram illustrating in detail an arson recognition module according to an embodiment of the present disclosure.

FIG. 5 is a block diagram illustrating in detail an arson recognition module according to an embodiment of the present disclosure.

Referring to FIG. 5, an arson recognition module 420 is a module for detecting a fire situation and identifying arson behavior using text describing a situation. A visual-language model of FIG. 5 may use known models, such as Contrastive Language-Image Pretraining (CLIP), Florence, Flamingo, and the like that are trained with a large amount of image-text pairs, but the scope of the present disclosure is not limited thereto.

The conventional technology uses methods of detecting the location of fire by recognizing an image including fire or by using an object detection module that is trained to recognize a region on fire as an object. These methods may stably operate when a huge-scale datasets are leaned, but there is a lack of datasets in which images capturing fire in consideration of various shapes and aspects thereof depending on the environment and combustible materials are included, because it is expensive to collect such datasets. Due to the lack of diversity of collected fire images, a model trained using the conventional methods may be very vulnerable to a change in the CCTV environment. Therefore, the existing methods require the process of additionally collecting data and learning the same in a new installation place.

Also, because most existing technologies for detecting the location of fire have been developed with the purpose of locating the place in which a big fire broke out and responding to the fire, they do not deal with an arson situation in which an arsonist starts to set fire. In order to identify arson in which a person sets fire in order to threaten a facility or a place, it may be more important to recognize arson behavior than to detect the location of fire.

As described above, the conventional fire detection technology has a disadvantage that it is vulnerable to various fire situations of different shapes due to the absence of a large-scale dataset, and cannot recognize arson behavior of setting fire. Therefore, the existing fire detection method is not adequate to construct a video surveillance system for identifying an arsonist and detecting fire in its early stages in a CCTV environment. The method of detecting an arson situation according to an embodiment of the present disclosure is an inference method based on image-text comparison for stably operating in an unlearned environment by solving a data shortage problem.

In order to enable inference based on image-text comparison, a model pretrained with a large amount of datasets including text describing images is used. The pretrained model uses hundreds of millions of images and is trained to search for the text best describing a corresponding image, among hundreds of millions of image descriptions, at a similar mapping point in the same space. A pretrained visual information transformer and a pretrained linguistic information transformer may transform images and text to be put in the same space, that is, a contrastive embedding space.

Using vision-language cross vectors mapped to the contrastive embedding space, text information describing an image may be retrieved or an image related to text information may be retrieved using the text information. Existing ontology-based inference is vulnerable to an unlearned environment and requires retraining in order to detect a new detection target. However, an inference method based on image-text comparison uses a model configured to interpret an image as linguistic information by being trained with a large amount of data, thereby enabling inference based on natural language and setting and recognition of a new detection target.

The arson recognition module 420 recognizes an arson situation by comparing image information received from a CCTV with text information describing an anomalous situation in the same space. The arson recognition module 420 transforms scene information in the entire screen area of CCTV video, segments patches based on local information, and uses the same in order to analyze information from many different angles. In the example of FIG. 5, the detected human region and the image of the region in which a human stays are mapped to a comparison space through the visual information transformer in order to extract visual information.

The linguistic information transformer maps text describing the situation to be detected to the same comparison space. The image information and the text description mapped to the same space are used to calculate the similarity therebetween or are compared with normal circumstances, whereby arson may be recognized. In FIG. 5, not only a scene but also behavior may be simultaneously recognized through a description of the scene and a description of arson behavior.

The inference method based on image-text comparison according to an embodiment uses visual-linguistic information transformers trained with a large amount of data, thereby having versatility robust to various environments. This method enables stable inference based on natural language by learning a transformation process, which enables not only understanding of text describing an object but also understanding of interaction between the behavior of a person and an object appearing in an image as language. Because a recognition module receives an image and represents the same as language familiar to a human, it may interpret an inference result and enable interaction with a human.

The inference method based on image-text comparison according to an embodiment is an adaptive method capable of adjusting a detection target by changing a text description in accordance with the environment in which the method is used. For example, text such as "a bonfire glowing white appears" may be added to detection items and immediately adapted to the environment without learning. Also, adverbs, such as "at night", "in the morning", "in a snowy day", "in a rainy day", and the like, are added using time information or weather information pertaining to the capturing environment, whereby detection accuracy may be improved.

The human-behavior-focused anomaly detection unit 500 recognizes the behavior of a human by receiving human detection information and human trajectory information and detects the section in which the behavior occurs, thereby detecting fighting and falling down, which are anomalous situations related to human behavior.

A human behavior recognition module 510 is a module for recognizing human behavior and continuously recognizing the types of behavior by receiving the images of regions of interest of a human over time using the human location and the tracking result acquired by the human detection and tracking unit 200. A behavior recognition model in the present disclosure may use known models, such as R(2+1) D-18, and the like, and continuously classifies the behavior of a human appearing in the scenes and transfers the classification result to an abnormal behavior section detection module 520.

The abnormal behavior section detection module 520 may detect the section of abnormal behavior by processing the behavior classification result of the human behavior recognition module 510 as time-series data. The classification result of the human behavior recognition module 510 may be processed by being loaded into an abnormal behavior classification queue and an abnormal behavior section detection queue. The abnormal behavior classification queue may be used to determine the type of final abnormal behavior for each processed image, and the abnormal behavior section detection queue may be used to determine the section in which the final abnormal behavior determined by the abnormal behavior classification queue occurred.

Figure 6:
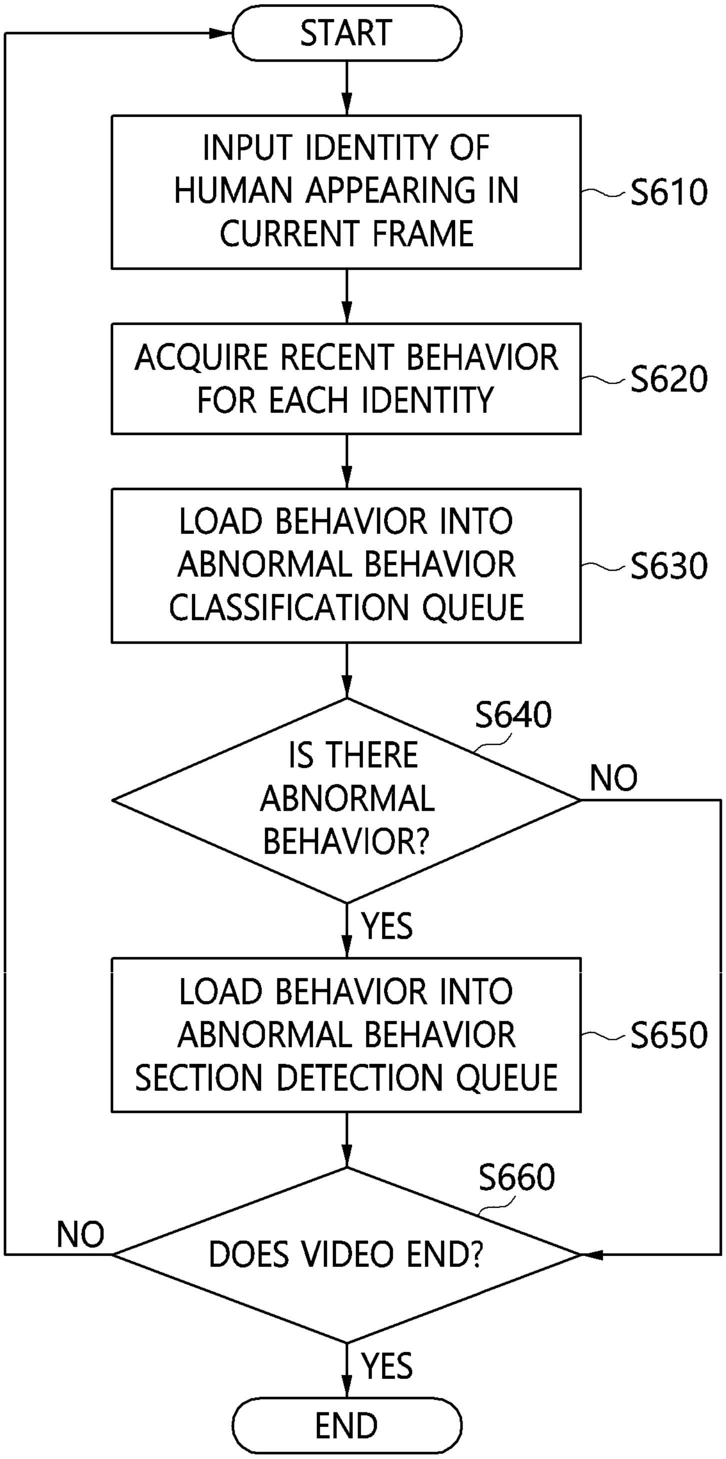
FIG. 6 is a flowchart illustrating a process of detecting an abnormal behavior section.

FIG. 6 is a flowchart illustrating a process of detecting an abnormal behavior section.

Referring to FIG. 6, in the method for detecting an abnormal behavior section according to an embodiment of the present disclosure, the identities of humans appearing in the current frame are input at step S610, and the recent behavior of the human corresponding to each identity is acquired at step S620. Here, for the human identity at each time point, behavior corresponding to the most reliable classification result, among the classification results of the most recent behavior, may be defined as the behavior of the human having the identity at the corresponding time point. When behavior of a human cannot be classified because an appearance time period is too short, the behavior may be dealt with as normal behavior.

The behaviors of all humans appearing at each time point are acquired, and the most frequent behavior is loaded into the abnormal behavior classification queue at step S630. In contrast, frequent behavior is calculated for only abnormal behavior (fighting or falling down), among the behaviors of all humans appearing at each time point, and is loaded into the abnormal behavior section detection queue at steps S640 and S650.

The method for detecting an abnormal behavior section includes two steps. First, the most frequently occurring behavior, among the behaviors in the abnormal behavior classification queue, is acquired. The acquired behavior is defined as main behavior occurring in the input video. In order to detect the section of the main behavior, only the main behavior is left in the abnormal behavior section detection queue. Then, a cluster is formed through connection of a fixed number of frames, and finally acquired respective clusters may be defined as the section of the main behavior of the input video. The above process (steps S610 to S650) may be repeated until the video ends at step S660.

Figure 7:
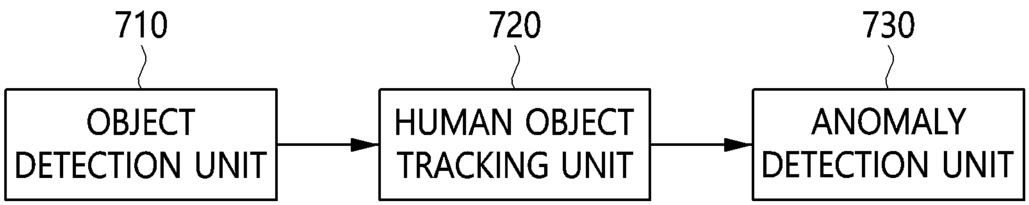
FIG. 7 is a block diagram illustrating an apparatus for integrated anomaly detection according to an embodiment of the present disclosure.

FIG. 7 is a block diagram illustrating an apparatus for integrated anomaly detection according to an embodiment of the present disclosure.

Referring to FIG. 7, the apparatus for integrated anomaly detection according to an embodiment of the present disclosure includes an object detection unit 710 for detecting a thing object and a human object in input video using a first neural network, a human object tracking unit 720 for tracking the human object, and an anomaly detection unit 730 for detecting an anomalous situation based on an object detection result and a human object tracking result.

Here, the human object tracking unit 720 may track a human object using first feature information generated based on the intermediate operation result of the first neural network and second feature information extracted using a second neural network to which a human object region, corresponding to the final operation result of the first neural network, is input.

Here, the intermediate operation result may include spatial information and texture information pertaining to the input video, and the first feature information may be extracted by masking the region of the detected human object for the intermediate operation result.

Here, the human object tracking unit 720 may match the same human objects in frames using the first feature information and the second feature information.

Here, the first feature information may correspond to an M-dimensional feature vector, and the second feature information may correspond to an N-dimensional feature vector.

Here, the human object tracking unit 720 may track the human object using an (M+N)-dimensional feature vector generated based on the first feature information and the second feature information.

Here, the human object tracking result may include the region occupied by the human object and the moving trajectory information of the human object.

Here, the human object tracking unit 720 may identify a thing object erroneously detected as a human object based on the moving trajectory information of the human object.

Here, the human object tracking unit 720 may calculate a motion vector corresponding to the moving trajectory of the human object and identify the thing object erroneously detected as a human object using the result of an outer product operation on the motion vectors of respective sections.

Here, the anomaly detection unit 730 may detect an arson situation using visual feature information corresponding to the input video and linguistic feature information corresponding to text describing an arson situation.

Figure 8:
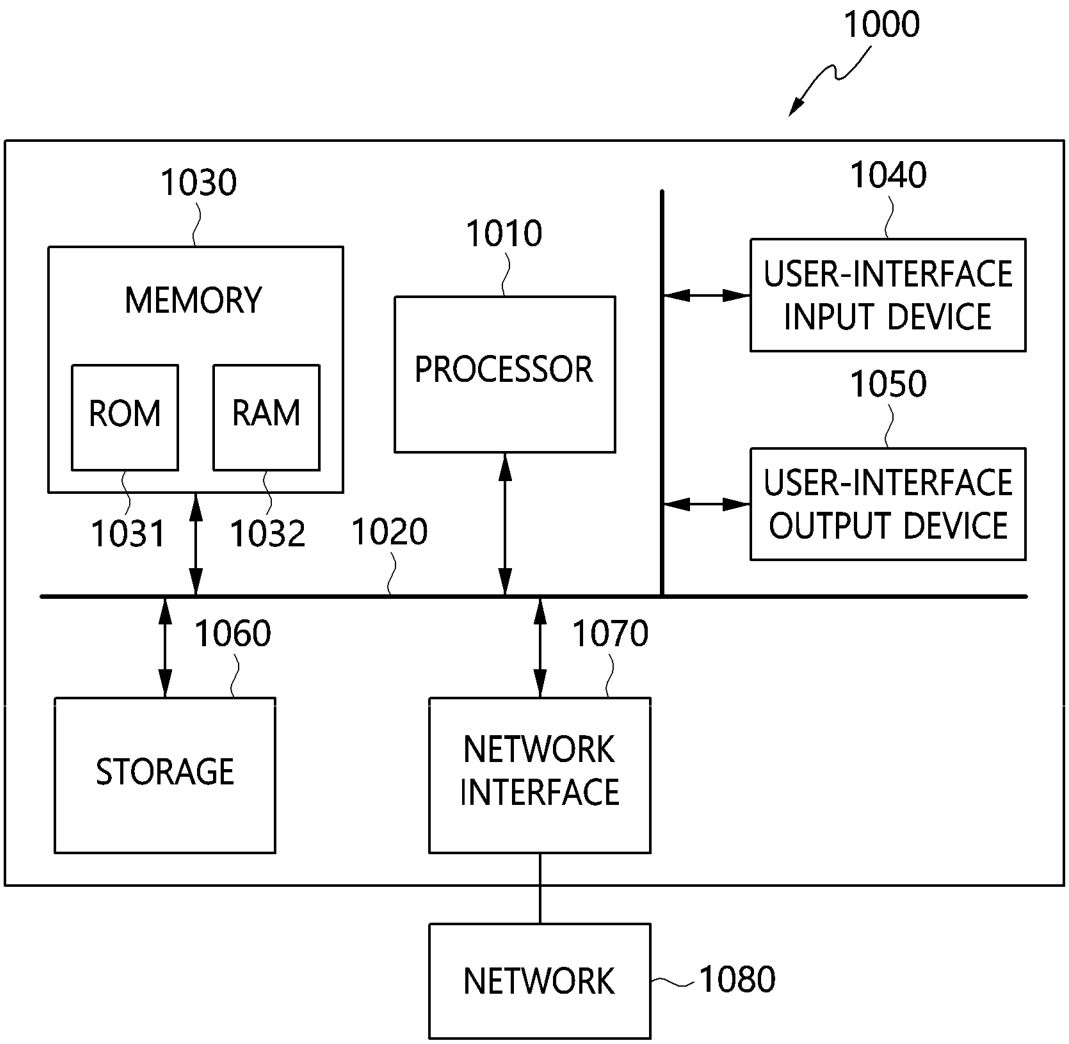
FIG. 8 is a view illustrating the configuration of a computer system according to an embodiment.

FIG. 8 is a view illustrating the configuration of a computer system according to an embodiment.

The apparatus for integrated anomaly detection according to an embodiment may be implemented in a computer system 1000 including a computer-readable recording medium.

The computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected to a network 1080. The processor 1010 may be a central processing unit or a semiconductor device for executing a program or processing instructions stored in the memory 1030 or the storage 1060. The memory 1030 and the storage 1060 may be storage media including at least one of a volatile medium, a non-volatile medium, a detachable medium, a non-detachable medium, a communication medium, or an information delivery medium, or a combination thereof. For example, the memory 1030 may include ROM 1031 or RAM 1032.

According to the present disclosure, an integrated anomaly detection structure capable of simultaneously responding to the occurrence of multiple anomalous situations may be provided.

Also, the present disclosure may provide a filtering technique capable of reducing false detection as a human object and tracking failures.

Also, the present disclosure may provide an anomaly detection method that robustly operates in various environments without collecting additional data.

Specific implementations described in the present disclosure are embodiments and are not intended to limit the scope of the present disclosure. For conciseness of the specification, descriptions of conventional electronic components, control systems, software, and other functional aspects thereof may be omitted. Also, lines connecting components or connecting members illustrated in the drawings show functional connections and/or physical or circuit connections, and may be represented as various functional connections, physical connections, or circuit connections that are capable of replacing or being added to an actual device. Also, unless specific terms, such as "essential", "important", or the like, are used, the corresponding components may not be absolutely necessary.

Accordingly, the spirit of the present disclosure should not be construed as being limited to the above-described embodiments, and the entire scope of the appended claims and their equivalents should be understood as defining the scope and spirit of the present disclosure.

What is claimed is:

1. A method for integrated anomaly detection, performed by an anomaly detection apparatus, comprising:

detecting objects in input video using a first neural network, and identifying a moving object among the detected objects;

tracking the moving object; and detecting an anomalous situation based on an object detection result of the detected objects and a moving object tracking result of the moving object, wherein the moving object tracking result includes a region occupied by the moving object and moving trajectory information of the moving object, and tracking the moving object comprises identifying an object erroneously detected as the moving object based on the moving trajectory information of the moving object, and wherein tracking the moving object further comprises calculating a motion vector corresponding to a moving trajectory of the moving object and identifying the object erroneously detected as the moving object using a result of an outer product operation on motion vectors for respective sections.

2. The method of claim 1, wherein tracking the moving object is performed using first feature information generated based on an intermediate operation result of the first neural network and second feature information extracted using a second neural network to which a moving object region corresponding to the moving object and to a final operation result of the first neural network is input.

3. The method of claim 2, wherein the intermediate operation result includes spatial information and texture information pertaining to the input video, and the first feature information is extracted by masking a region of the moving object for the intermediate operation result.

4. The method of claim 2, wherein tracking the moving object comprises matching identical moving objects in frames using the first feature information and the second feature information.

5. The method of claim 2, wherein the first feature information and the second feature information correspond to an M-dimensional feature vector and an N-dimensional feature vector, respectively, and tracking the moving object comprises tracking the moving object using an (M+N)-dimensional feature vector generated based on the first feature information and the second feature information.

6. The method of claim 1, wherein detecting the anomalous situation comprises detecting an arson situation using visual feature information corresponding to the input video and linguistic feature information corresponding to text describing the arson situation.

7. The method of claim 6, wherein detecting the anomalous situation comprises mapping the visual feature information and the linguistic feature information to an identical comparison space and calculating a similarity between the visual feature information and the linguistic feature information, thereby detecting the arson situation.

8. The method of claim 6, wherein the visual feature information is generated based on the input video, an image of a region of the moving object, and an image of a region in which the moving object is determined to stay longer than a preset time.

9. The method of claim 1, wherein detecting the anomalous situation comprises detecting moving object behavior, setting main behavior of each section based on a frequency of the moving object behavior, and calculating a section in which an anomalous situation occurs using information about the main behavior of each section.

10. The method of claim 1, wherein the anomalous situation includes intrusion, loitering, arson, abandonment, fighting, and falling down.

11. An apparatus for integrated anomaly detection, comprising:

an object detection unit for detecting objects in input video using a first neural network and identifying a moving object among the detected objects;

a moving object tracking unit for tracking the moving object; and an anomaly detection unit for detecting an anomalous situation based on an object detection result of the detected objects and a moving object tracking result of the moving object, wherein the moving object tracking result includes a region occupied by the moving object and moving trajectory information of the moving object, and the moving object tracking unit identifies an object erroneously detected as the moving object based on the moving trajectory information of the moving object, and wherein the moving object tracking unit calculates a motion vector corresponding to a moving trajectory of the moving object and identifies the object erroneously detected as the moving object using a result of an outer product operation on motion vectors for respective sections.

12. The apparatus of claim 11, wherein the moving object tracking unit tracks the moving object using first feature information generated based on an intermediate operation result of the first neural network and second feature information extracted using a second neural network to which a moving object region corresponding to the moving object and to a final operation result of the first neural network is input.

13. The apparatus of claim 12, wherein the intermediate operation result includes spatial information and texture information pertaining to the input video, and the first feature information is extracted by masking a region of the moving object for the intermediate operation result.

14. The apparatus of claim 12, wherein the moving object tracking unit matches identical moving objects in frames using the first feature information and the second feature information.

15. The apparatus of claim 12, wherein the first feature information and the second feature information correspond to an M-dimensional feature vector and an N-dimensional feature vector, respectively, and the moving object tracking unit tracks the moving object using an (M+N)-dimensional feature vector generated based on the first feature information and the second feature information.

16. The apparatus of claim 11, wherein the anomaly detection unit detects an arson situation using visual feature information corresponding to the input video and linguistic feature information corresponding to text describing the arson situation.

* * * * *